UNITED STATES PATENT OFFICE.

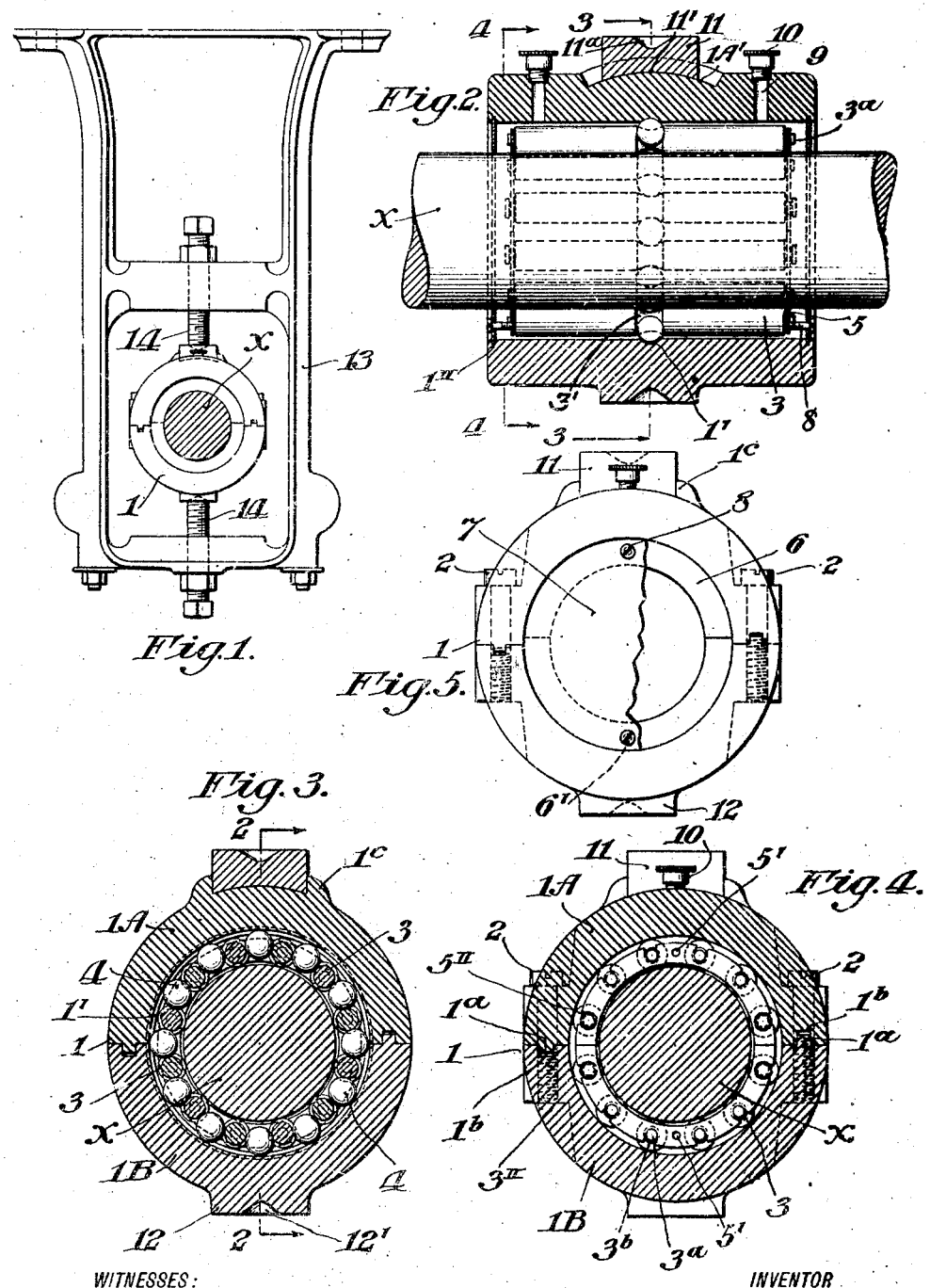

HENRY STUEBNER, OF PHILADELPHIA, PENNSYLVANIA.

ANTIFRICTION-BEARING.

1,068,019.

Specification of Letters Patent. Patented July 22, 1913.

Application filed August 19, 1912. Serial No. 715,713.

*To all whom it may concern:*

Be it known that I, HENRY STUEBNER, a citizen of the United States, residing in the city of Philadelphia, county of Philadelphia, and State of Pennsylvania, have invented certain Improvements in Antifriction-Bearings, of which the following is a specification.

My invention is designed to provide an improved roller bearing having parts which can be readily assembled and conveniently applied in place, particularly on line shafting, deflections in which it is adapted to accommodate, with avoidance of grinding and wearing of the load carrying rollers which are positioned by balls disposed in raceway grooves therein.

My preferred construction comprises a sectional bearing box or casing having a universal support and containing load carrying rollers which are held against radial movement by sectional cages adapted to be fixed, in assembling the bearing, to the casing sections through flanges thereon forming seats for caps by which the movable parts of an unmounted bearing may be protected, the rollers being held against longitudinal movement by balls disposed in raceway grooves therein and in the casing.

The characteristic features of my invention are set out in the following description and the accompanying drawings in illustration thereof, in which—

Figure 1 is an end elevation of my improved bearing mounted in a bracket therefor; Fig. 2 is a longitudinal sectional view of the bearing on the line 2—2 of Fig. 3; Fig. 3 is a transverse sectional view on the line 3—3 of Fig. 2; Fig. 4 is a transverse sectional view on the line 4—4 of Fig. 2; and Fig. 5 is an end elevation, partly broken away, showing the application of a sealing cap to my bearing.

In the drawings is shown a bearing box or casing 1 comprising sections $1^A$ and $1^B$ each having a tenon $1^a$ and a mortise $1^b$ which coöperate to secure coördination and prevent lateral movement of the sections, which are held together by bolts 2.

Rollers 3, disposed in the casing 1 and adapted for carrying a shaft X, are spaced and held against longitudinal movement relative to the casing by balls 4 disposed in races $3'$ of the rollers and the race $1'$ of the casing. Sectional rings 5, provided with the apertures $5'$ and the notches $5''$, are adapted for holding the rollers 3 in the desired relations. The rollers are provided with the spindles $3^a$ engaged in the notches $5''$ and with the shoulders $3^b$ adapted for engaging the inner faces of the rings, heads $3''$ being provided on two of the rollers engaging the respective ring sections to hold the latter against disengagement from the spindles by lateral movement.

Sectional rings 6, provided with the apertures $6'$, are fixed in grooves $1''$ of the casing sections, sections of the rings having ends extending beyond the casing section in which their bodies are seated into engagement with the complementary casing section, whereby relative longitudinal movement of such casing sections is prevented and exact registration of the parts is secured. These sectional rings 6 provide means for holding screws 8 adapted to be passed therethrough into the apertures $5'$ of the sectional rings 5, whereby the latter, together with the rollers 3 and balls 4, can be engaged to the sectional casing so that the separated sections of the casing shall each hold half of the rollers, together with the balls lying between them, through the engagement therewith of the separated sections of the rings 5 and 6. The rings 6 also provide means for protecting the interior of the bearing in operation, and, further, for holding in or over the open ends of the connected casing sections the disks or plates 7, fixed in place by the screws or pins 8, whereby the interior of the unmounted bearing is protected and dirt is excluded therefrom.

Lubrication may be effected through the oil passages 9 in the casing section $1^A$, the passages being normally closed by the caps 10.

The casing section $1^A$ is provided with a curved surface $1^{A'}$ having an axis of curvature transverse to and suitably intersecting the axis of the bearing. A bearing block 11, disposed between the lugs $1^c$ of the section $1^A$ is provided with a curved surface $11'$ concentric with and engaging the surface $1^{A'}$, and with a conical step $11^a$ adapted to be engaged by the pivot or point of a screw 14 adjustable in the hanger 13. The casing section $1^B$ is provided with a bearing 12 having a conical step $12'$ adapted to be engaged by the pivot or point of a screw 14 adjustable in the hanger 13.

In assembling the parts, the sections $1^A$ and $1^B$ may be, conveniently, disposed so that their inner cylindrical bearing surfaces lie upward to permit the rollers 3 and the balls 4 to be placed therein and supported thereby and the notches or bearings 5" of the separated sections of the rings 5 engaged on the roller spindles 3ª. Or sections of the several rings 5 may be connected by journaling headed rollers in bearings thereof and the remaining rollers journaled in the remaining bearings thereof. Balls having been placed between the rollers in the grooves thereof, the several casing sections may be respectively placed over the several assemblages of antifriction elements. With the bearing sections and antifriction elements in position, screws or pins 8 are caused to engage the respective sections of the rings 5 to those of the rings 6, whereby balls and rollers in the respective casing sections are held therein and these sections can be placed on the shaft X conveniently; projecting ends of sections of rings 6, set in one casing section, being entered in grooves 1" of the complementary casing section, the tongues and grooves 1ª and 1ᵇ being engaged, the screws 2 caused to fix the casing sections together and the screws 14 caused to engage the respective steps 11' and 12'. The bearing being placed and adjusted, the screws 8 are detached to permit the rings 5 to revolve with the rollers 3 around the shaft X.

It will be understood that this bearing can be readily assembled and applied to any part of a line of shafting, being adjustable to effect its accommodation to the position of the shafting, and so that grinding and wearing are avoided.

Having described my invention, I claim:

1. A bearing having separable parts with complementary cylindrical surfaces and races, rollers containing races, balls engaging said races, sectional rings engaging the ends of said rollers, and means for securing the sections of said rings to the respective separable parts aforesaid.

2. A casing having separable parts provided with complementary races, cylindrical surfaces, and grooves, rollers provided with races, balls engaging said races, sectional rings engaging the ends of said rollers, sectional rings engaged in said grooves, and means for engaging sections of said first and second named rings together, whereby rollers and balls aforesaid are engaged to each of said separable parts.

3. A casing having separable parts provided with complementary races and cylindrical surfaces, rollers provided with spindles and races, balls engaging said races, ring sections having notches engaging said spindles, and means for engaging said ring sections to the respective separable parts aforesaid whereby balls and rollers aforesaid are engaged within respective separable parts aforesaid.

4. A casing having separable parts provided with complementary cylindrical surfaces and channels, rollers engaging said surfaces, said rollers having spindles, separable ring sections engaging said spindles, a ring section engaging a channel of one of said parts and extending into the channel of the other of said parts, and means for engaging said last named ring section to a ring section aforesaid.

In witness whereof I have hereunto set my name this 13th day of August, 1912, in the presence of the subscribing witnesses.

HENRY STUEBNER.

Witnesses:
Jos. G. Denny, Jr.,
Wm. Schlicht.